United States Patent [19]

Honma

[11] Patent Number: 5,101,282

[45] Date of Patent: Mar. 31, 1992

[54] VARIABLE MAGNIFICATION IMAGE

[75] Inventor: Tsuyoshi Honma, Tokyo, Japan

[73] Assignee: Canon Kabushiki Kaisha, Tokyo, Japan

[21] Appl. No.: 489,885

[22] Filed: Mar. 7, 1990

Related U.S. Application Data

[63] Continuation of Ser. No. 148,583, Jan. 26, 1988, abandoned.

[30] Foreign Application Priority Data

Jan. 27, 1987 [JP] Japan ................. 62-15124

[51] Int. Cl.5 ............................................. H04N 1/04
[52] U.S. Cl. ................................. 358/451; 358/474; 358/486
[58] Field of Search ............... 358/474, 476, 486, 448, 358/451, 455, 456

[56] References Cited

U.S. PATENT DOCUMENTS

| | | | |
|---|---|---|---|
| 4,536,802 | 8/1985 | Kurata | 358/287 |
| 4,583,127 | 4/1986 | Kurata et al. | 358/298 |
| 4,635,129 | 1/1987 | Miyagi . | |
| 4,636,869 | 1/1987 | Tomohisa et al. | 358/287 |
| 4,679,096 | 7/1987 | Nagashima . | |
| 4,682,243 | 7/1987 | Hatayama | 358/287 |
| 4,686,580 | 8/1987 | Kato et al. | 358/287 |
| 4,701,805 | 10/1987 | Maeshima | 358/287 |
| 4,712,141 | 12/1987 | Tomohisa et al. | 358/280 |
| 4,731,657 | 3/1988 | Miyagi . | |
| 4,743,963 | 5/1988 | Abuyama | 358/287 |
| 4,750,048 | 6/1988 | Satoh et al. . | |
| 4,751,376 | 7/1988 | Sugiura et al. | 358/287 |
| 4,771,473 | 9/1988 | Sugiura | 358/287 |
| 4,809,083 | 2/1989 | Nagano et al. | 358/451 |
| 4,999,717 | 3/1991 | Nagashima | 358/474 |

FOREIGN PATENT DOCUMENTS

| | | |
|---|---|---|
| 35875 | 9/1981 | European Pat. Off. . |
| 3510825 | 10/1985 | Fed. Rep. of Germany . |
| 3611984 | 10/1986 | Fed. Rep. of Germany . |
| 57-131170 | 8/1982 | Japan . |
| 59-45765 | 3/1984 | Japan . |
| 2096429 | 10/1982 | United Kingdom . |

Primary Examiner—James J. Groody
Assistant Examiner—Kim Y. Vu
Attorney, Agent, or Firm—Fitzpatrick, Cella, Harper & Scinto

[57] ABSTRACT

An image processing apparatus includes a scanning system for reading a document image, and a scanning system driving unit for relatively moving and scanning the document image and the scanning system. The scanning system is driven in accordance with input drive pulses. The apparatus also includes a control unit for changing the number of drive pulses to be supplied to the scanning system in accordance with an input variable magnification. The scanning system has a CCD for converting the document image into an electric signal.

8 Claims, 9 Drawing Sheets

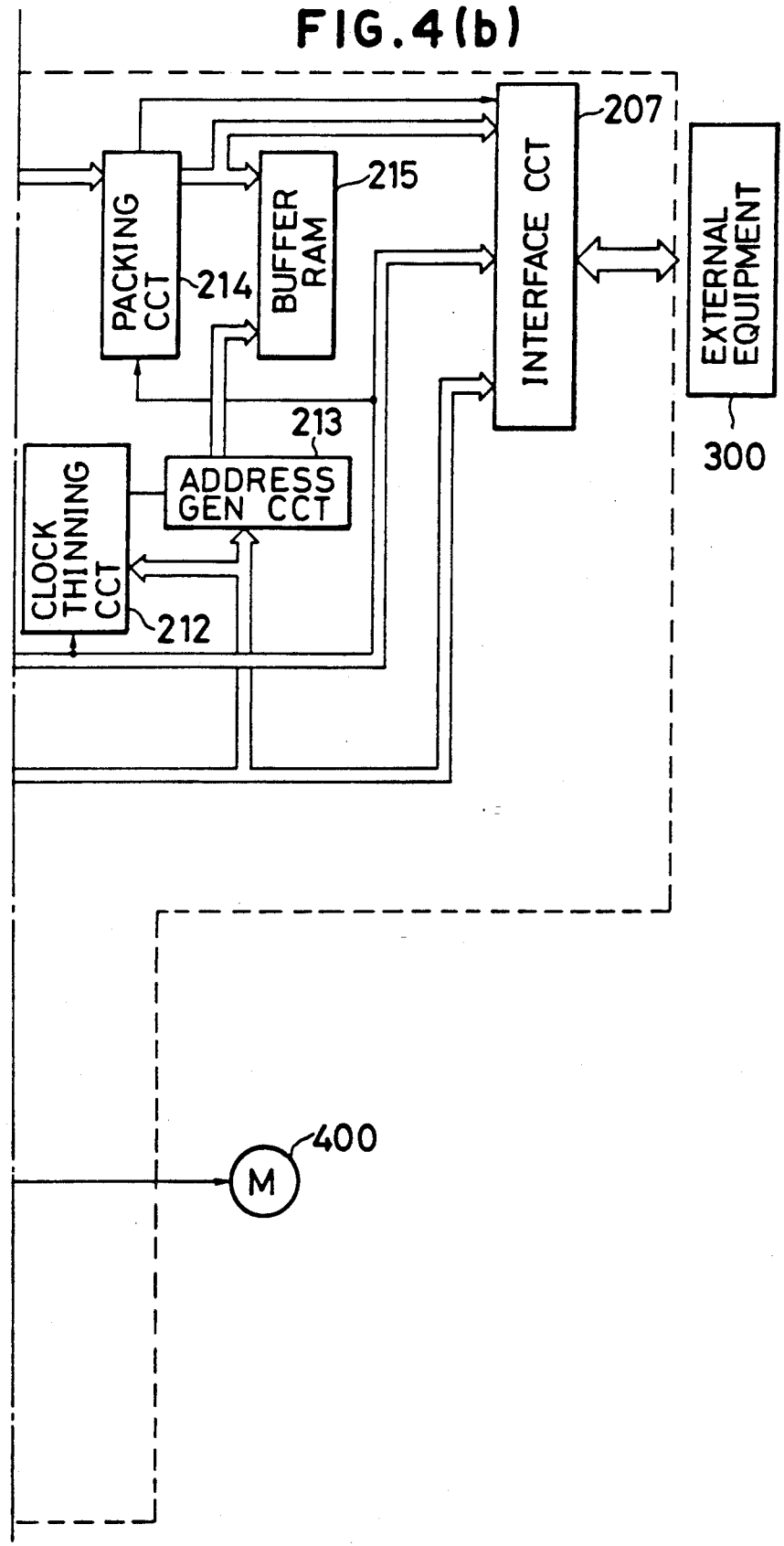

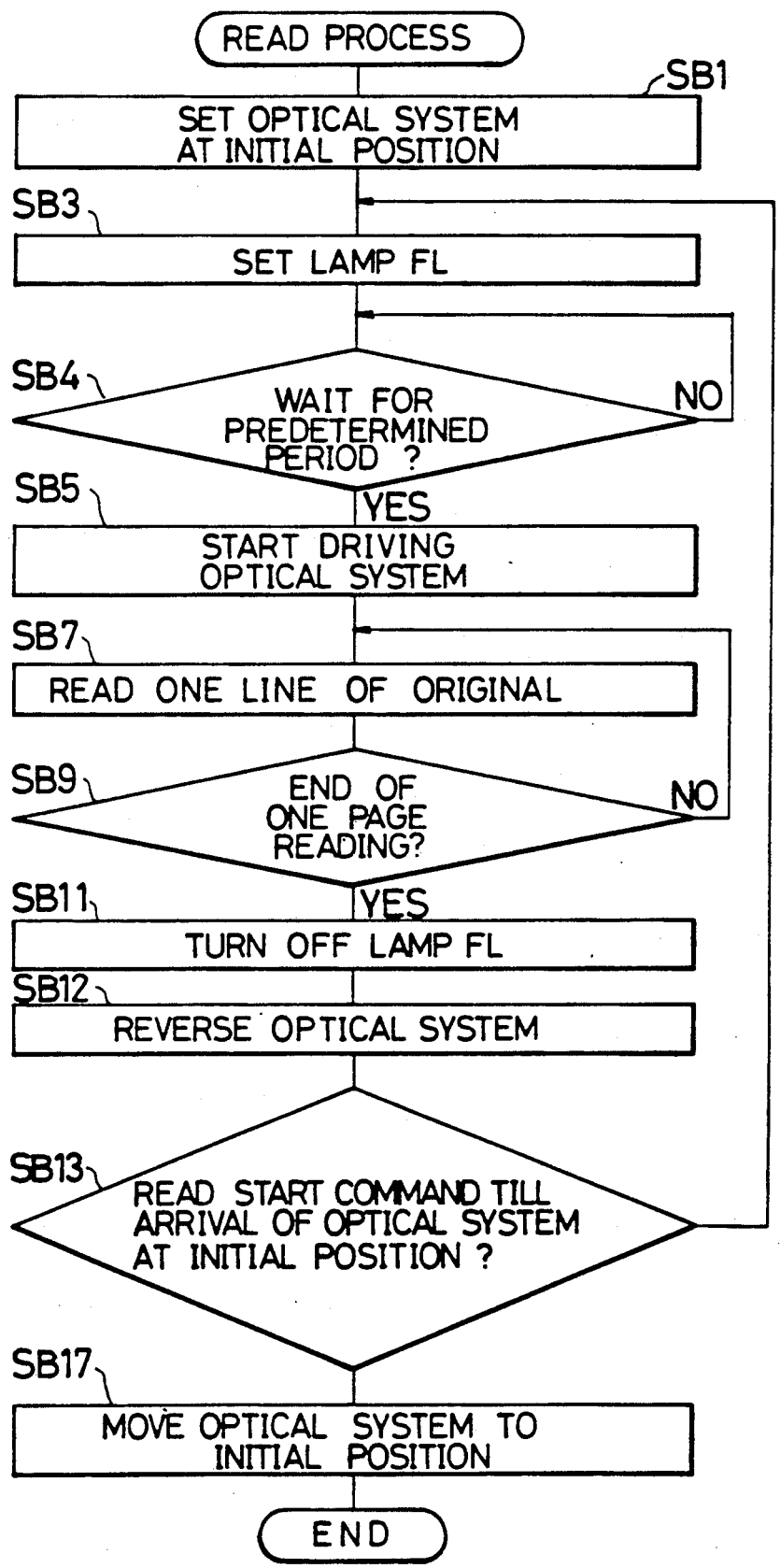

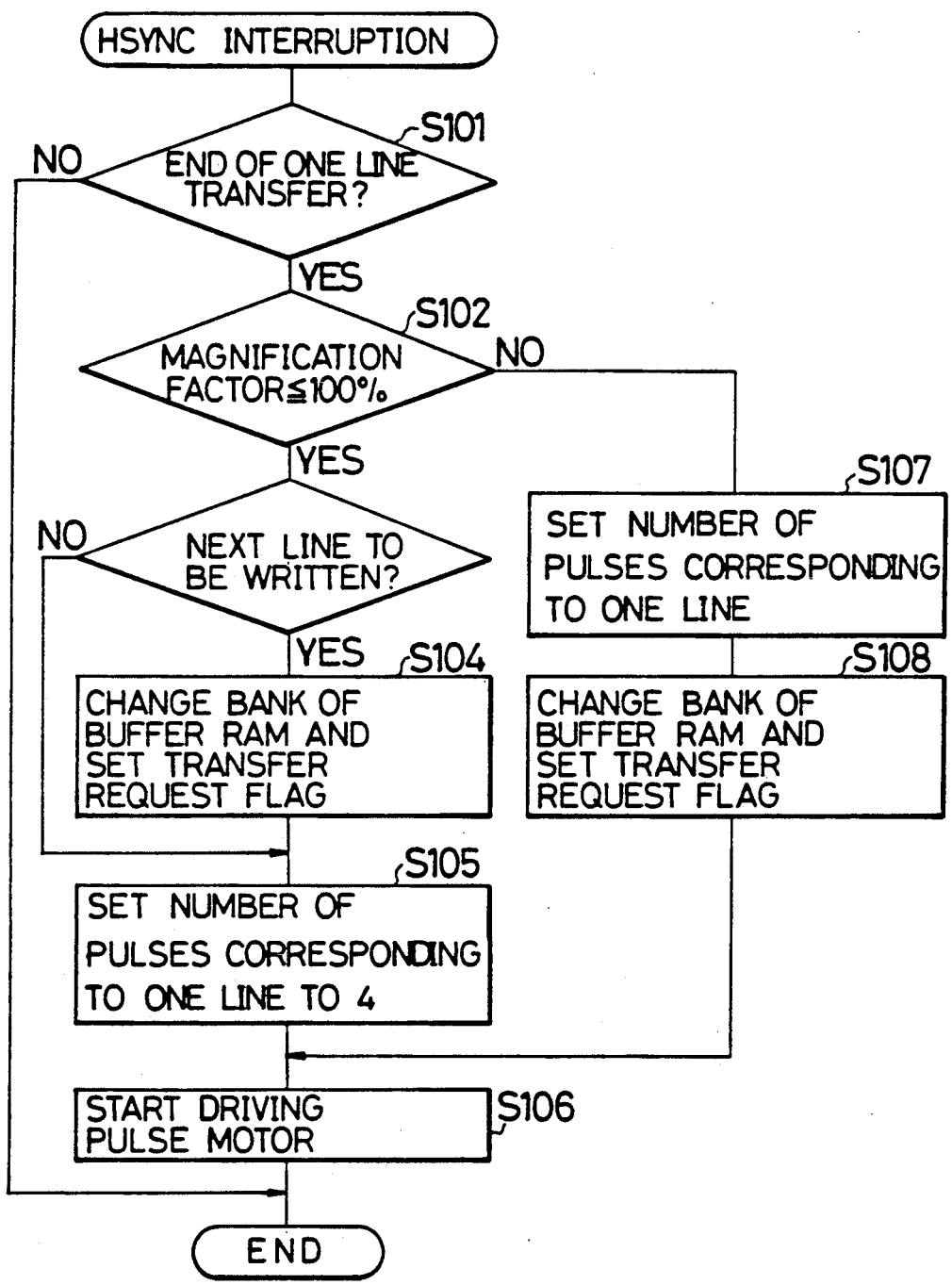

VARIABLE MAGNIFICATION IMAGE

This application is a continuation of application Ser. No. 07/148,583, filed Jan. 26, 1988, now abandoned.

BACKGROUND OF THE INVENTION

1. Field of the Invention

The present invention relates to an image processing apparatus for processing an image.

2. Related Background Art

A conventional image reading apparatus is known. In this apparatus, a photoelectric conversion means such as a CCD (charge coupled device) is moved relative to an image formed on a document surface or a film surface to scan. A read optical image is converted to an electric signal, and the electric signal is then converted to a parallel digital (bi-level or multi-level) electric signal (image signal). The digital electric signal is transferred to external equipment such as a host computer through an interface.

However, in a conventional image reading apparatus having an interface capable of transferring an image signal to a piece of external equipment, the sub-scan position must be controlled in units of lines in order to synchronize with the external equipment when the image signal is transferred. For this reason, if the apparatus employs a conventional variable magnification means for achieving a sub-scan variable magnification by changing a scan speed in accordance with a variable magnification factor, sub-scan position control in units of lines is very difficult to achieve. Furthermore, when a scanning-system driving apparatus employs a pulse motor, a problem of self-excitation frequency or vibration may occur depending on a variable magnification factor, thus limiting the range of usable variable magnification factors.

An improved image reading apparatus has already been disclosed in commonly-assigned U.S. patent application Ser. No. 513,810, filed on July 14, 1983, U.S. Pat. No. 4,635,129, and the like. An apparatus for variably magnifying an image signal has been disclosed in commonly-assigned U.S. patent application Ser. No. 590,753, filed on Mar. 19, 1984. However, a demand has arisen for a still further improved apparatus.

SUMMARY OF THE INVENTION

It is an object of the present invention to eliminate the above described conventional drawbacks.

It is another object of the present invention to improve an image processing apparatus.

It is still another object of the present invention to provide an image processing apparatus which can perform a variable magnification operation with a simple arrangement.

It is still another object of the present invention to provide an image processing apparatus which can perform a document reading operation with a simple arrangement.

It is still another object of the present invention to provide an image processing apparatus which can transfer image data in a desired format.

It is still another object of the present invention to provide an image processing apparatus which can accurately transfer image data.

It is still another object of the present invention to provide an image processing apparatus which can transfer accurate image data to external equipment while synchronizing with the external equipment even in a sub-scan variable magnification mode.

The above and other objects of the present invention will be apparent from the appended claims and the following description of the preferred embodiments taken in conjunction with the accompanying drawings.

BRIEF DESCRIPTION OF THE DRAWINGS

FIGS. 6A, 6B and 6C are control flow charts of the embodiment.

DETAILED DESCRIPTION OF THE PREFERRED EMBODIMENT

An embodiment of the present invention will be described with reference to the accompanying drawings.

Figure 1:
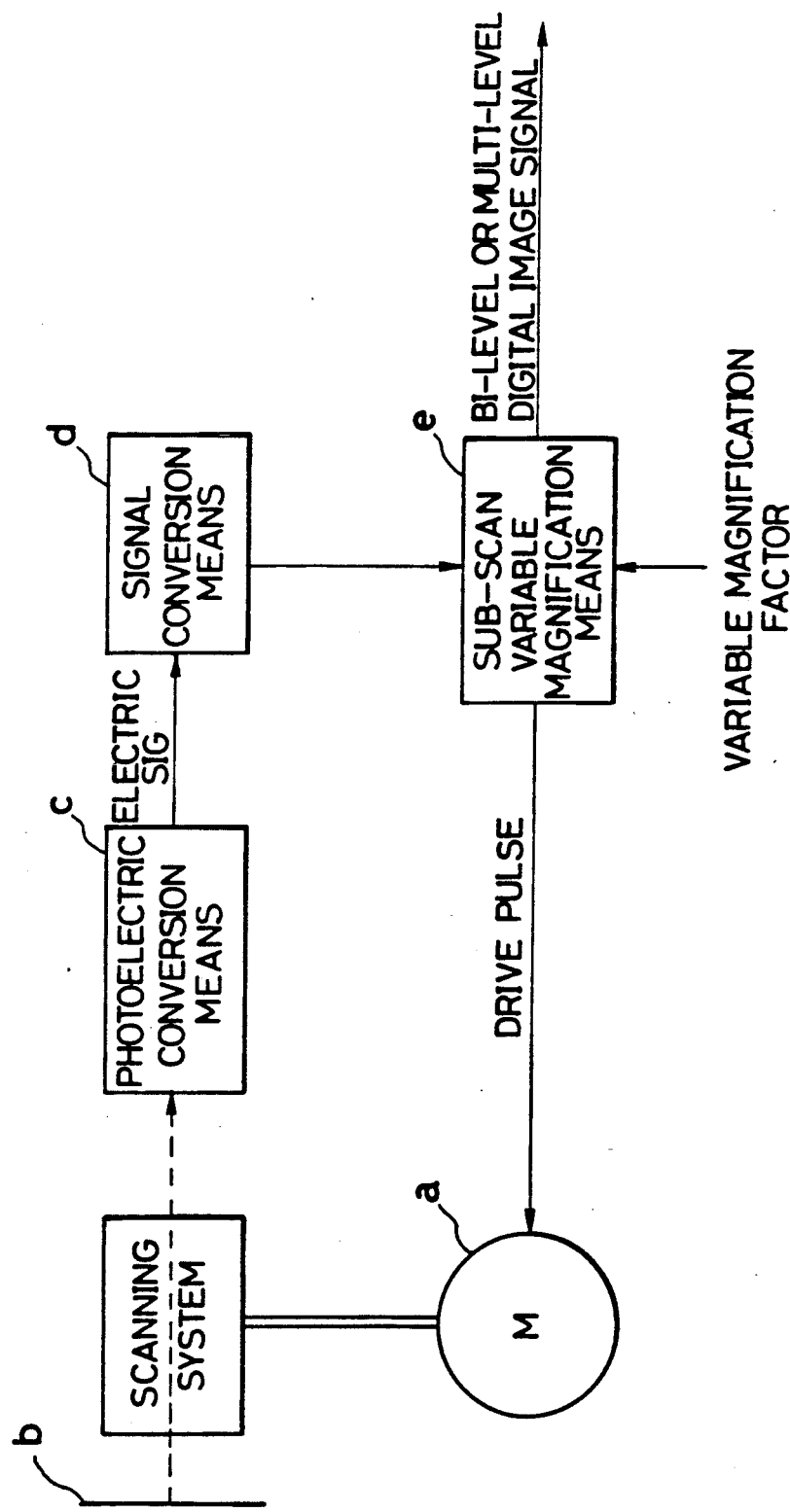
FIG. 1 is a block diagram showing a basic arrangement of an embodiment according to the present invention.

FIG. 1 shows a basic arrangement of an embodiment of the present invention. In FIG. 1, a scanning-system drive means a can control position and speed in accordance with the number and frequency of drive pulses.

The scanning-system drive means a moves a photoelectric conversion means c relative to a document image b to scan, so that a document image is converted to an electric signal. A signal conversion means d converts the electric signal (to be referred to as an image signal hereinafter) into a bi-level or multi-level digital signal. A sub-scan variable magnification means e executes a variable magnification in a sub-scan direction by changing the number of drive pulses supplied to the scanning-system drive means a in units of scan lines in accordance with a variable magnification factor.

When the variable magnification is set to be smaller than 1 (reduction mode), the sub-scan variable magnification means e can set the number of drive pulses for each line to be equal to that in the equal-magnification mode, and can output the bi-level or multi-level digital signal while thinning it in units of scan lines.

Figure 2:
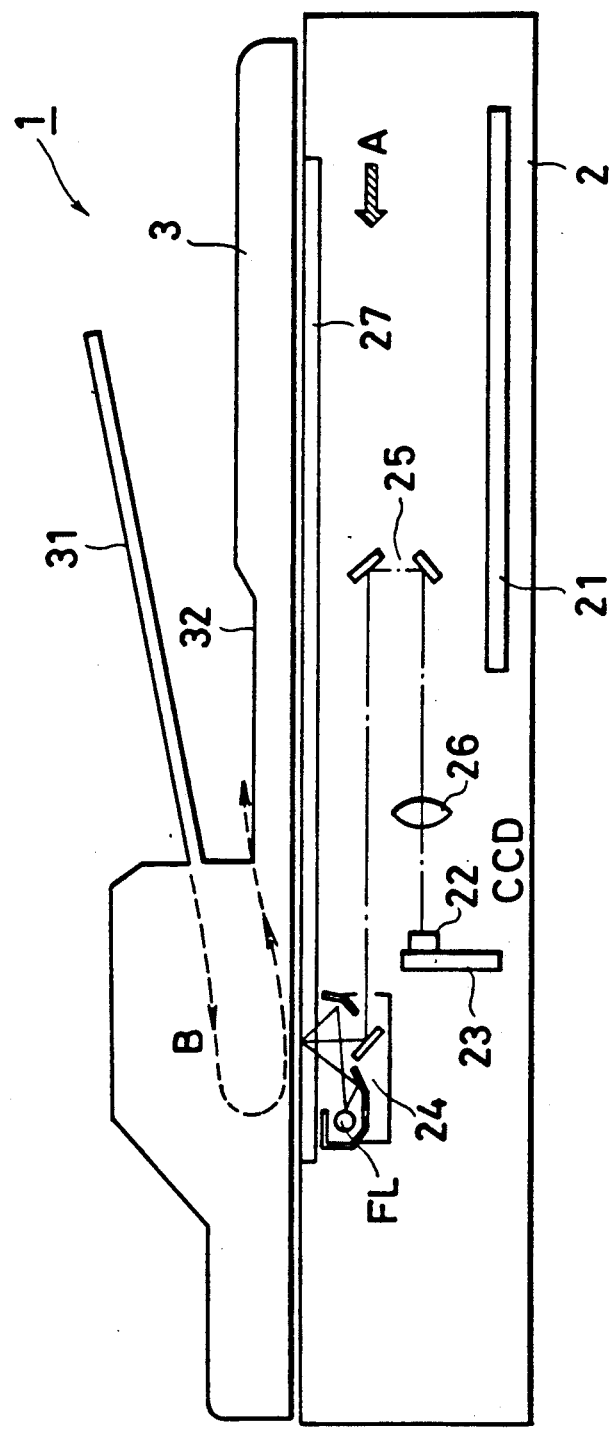
FIG. 2 is a sectional view showing an internal arrangement of an image reading apparatus to which the present invention is applied.
Figure 3:
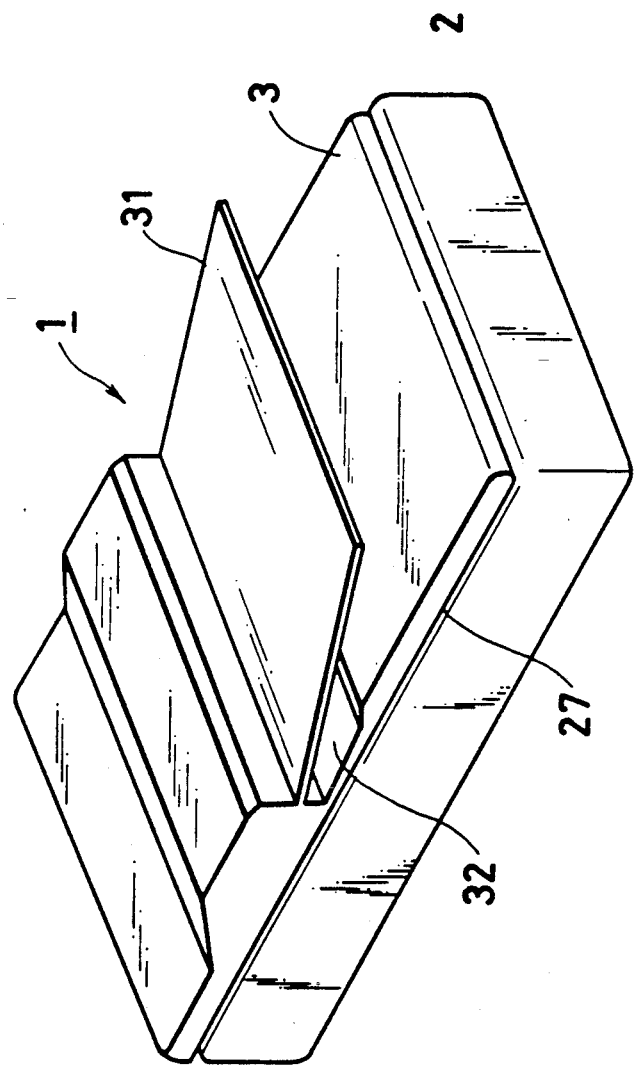
FIG. 3 is a perspective view showing an outer appearance of the image reading apparatus shown in FIG. 2.

FIG. 2 shows an internal arrangement of an image reading apparatus to which the present invention is applied, and FIG. 3 shows the outer appearance of the image reading apparatus. In FIG. 2, the image reading apparatus 1 is constituted by an image reading apparatus body 2 and an automatic document feeder 3. The image reading apparatus body 2 has a control unit 21, a CCD 22, a CCD driver 23, a document illumination unit 24, a reflection mirror 25, a lens 26, and a platen glass 27. The automatic document feeder 3 has a document table 31 and a document discharge tray 32.

A document placed on the document table 31 is conveyed in a direction indicated by arrow B, as indicated by a broken line in FIG. 2, and is discharged onto the document discharge tray 32 via the upper surface of the platen glass 27.

In this case, the document located on the platen glass 27 is illuminated by the document illumination unit 24, and a document image is focused on the CCD 22 through the focusing lens 26.

Figure 4A:
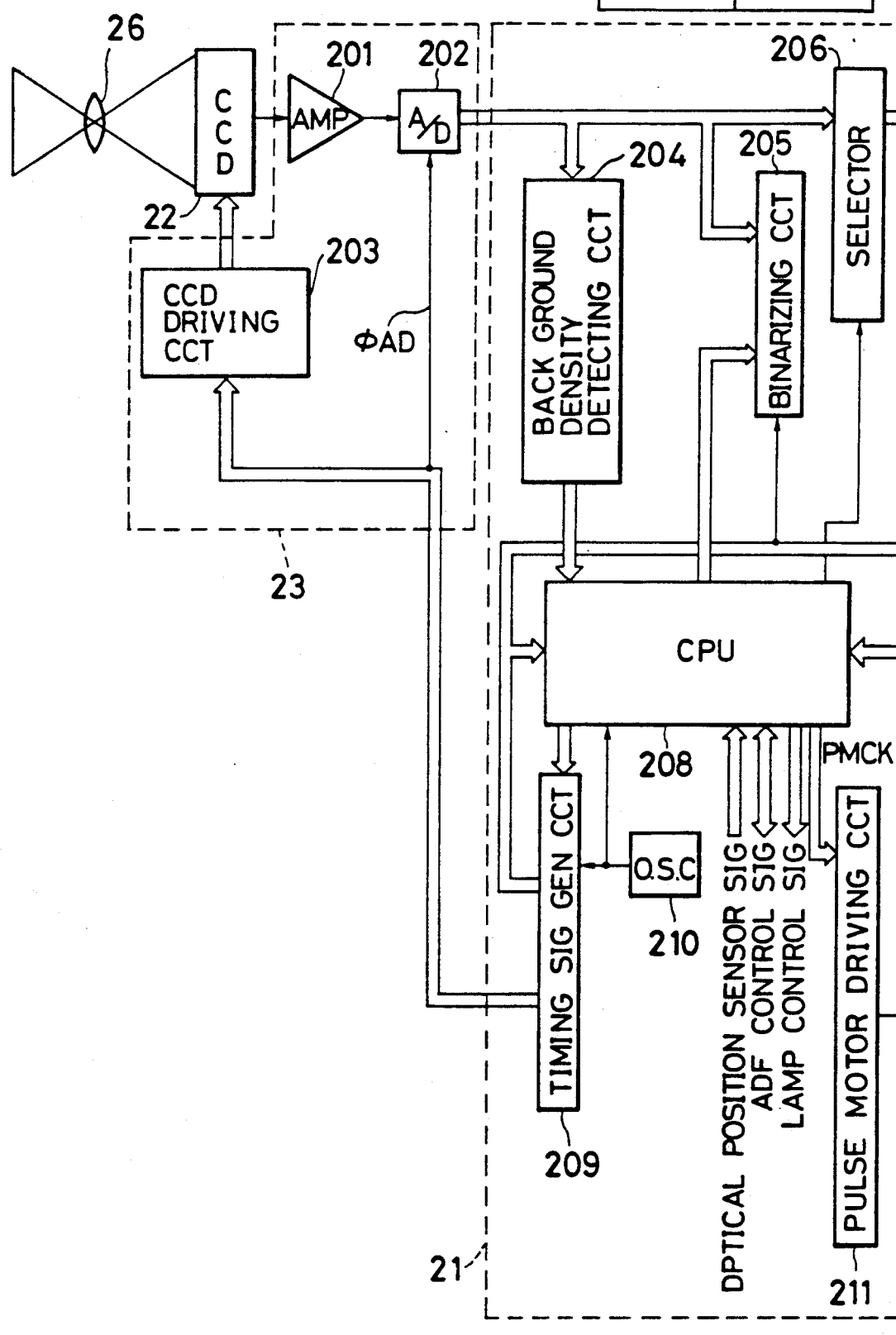
FIG. 4, consisting of FIGS. 4(a) and 4(b) is a block diagram showing a circuit arrangement of an embodiment of the present invention.

FIGS. 4(a) and 4(b) show circuit arrangements of the CCD driver 23 and the control unit 21 shown in FIG. 2.

The image reading apparatus 1 shown in FIG. 2 has a sheet-through mode for reading an image while conveying a normal unbound document using the automatic document feeder (to be referred to as an ADF hereinafter) 3, and a book mode for reading an image by scanning an optical system while placing a bound document like a book on the platen glass 27.

The sheet through mode will be described below. The image reading apparatus (to be referred to simply as a reader hereinafter) 1 is kept connected to external equipment (e.g., a digital printer or a personal computer) 300. Communication of control signals between the reader 1 and the external equipment 300 and an image signal output to the external equipment 300 are performed through an interface circuit 207. In a state wherein a document is placed on the document table 31 of the ADF 3 (images faces up), various mode commands are input from the external equipment 300. For example, mode commands for setting a pixel density (400 dpi, 300 dpi, or 200 dpi), a variable magnification factor (%), and an image signal mode (bi-level or multi-level signal) are input from the external equipment 300. A CPU Central Processing Unit 208 which receives these commands through the interface circuit 207 outputs a control signal to a timing generating circuit 209 and a selector 206, thereby presetting the pixel density and the image signal mode (bi-level or multi-level). An optical position sensor (not shown) checks if the document illumination unit 24 of the optical system is located at a document reading position (a position illustrated in FIG. 2) of the ADF 3.

If the illumination unit 24 is not located at the ADF document reading position, the document illumination unit 24 is moved to the ADF document reading position prior to a reading operation in response to the next document read start command. In this case, when a document read start command is input from the external equipment 300, the CPU 208 outputs a lamp control signal to turn on a lamp of the document illumination unit 24, and outputs a document feed start command to the ADF 3. The document placed on the document table 31 of the ADF 3 is conveyed in the direction indicated by arrow B along a path indicated by the broken line in FIG. 2.

In the reader 1 of this embodiment, a drive motor A used for driving the ADF document conveyance and the optical system scanning employs a stepping motor 400. Therefore, the frequency of the pulses for driving the motor 400 is changed through a pulse motor driving circuit 211, so that the scan speed can be desirably changed. A known document leading end sensor (not shown) provided to the ADF 3 detects whether or not the leading end of the document has reached the document illumination position of the reader 1.

When the document has reached the document illumination position, the CPU 208 outputs a control signal for enabling an image signal output to the interface circuit 207. Thus, image signals read by the CCD 22 are sequentially supplied to the external equipment 300.

After the image signals for a predetermined number of lines are transferred to the external equipment 300, the CPU 208 supplies a control signal for disabling an image signal output to the interface circuit 207, thereby interrupting the outputting of the image signals from the interface circuit 207. In addition, the CPU 208 supplies a document read end signal to the external equipment.

Thereafter, when no document read start command is input from the external equipment 300 within a predetermined period of time, the CPU 208 turns off the lamp of the document illumination unit 24 and completes the image read/transfer operation.

The book mode will be described below. In the book mode, the document is placed on the platen glass 27 so that its leading end is on the right side in FIG. 2. The document illumination unit 24 of the optical system has an initial position at the right end in FIG. 2. The position of the illumination unit 24 is detected by the optical position sensor (not shown) as in the sheet-through mode. The pixel density, the variable magnification factor, the image signal mode (bi-level or not) are set in the same manner as in the sheet through mode prior to the document read operation. When the document read start command is supplied from the external equipment through the interface circuit 207, the CPU 208 first outputs the lamp control signal to turn on a lamp FL of the document illumination unit 24. Note that document read scanning is not immediately started, and it is awaited for about 300 to 500 msec until a light amount of the lamp FL is stabilized.

Thereafter, the document illumination unit 24 is moved in a direction indicated by an arrow A in FIG. 2 to start document read scanning. The distance between the initial position of the document illumination unit 24 and the document leading end position on the platen glass 27 is about 2 to 3 mm, and during this interval, rotation of the motor 400 is controlled so that the scan speed of the optical system is stabilized. When the document illumination unit 24 has at the document leading end position described above, the CPU 208 outputs a control signal for enabling the image signal output to the interface circuit 207. Then, the image signals read by the CCD 22 are sequentially sent to the external equipment 300 through the interface circuit 207.

In the same manner as in the sheet-through mode, after the image signals for a predetermined number of lines are transferred, the CPU 208 determines that the document reading is ended, and turns off the lamp of the document illumination unit 24. Then, the CPU 208 outputs an image signal output disable signal to perform motor reverse rotation control of the motor 400, and outputs a document read end signal to the external equipment 300.

The document illumination unit 24 is moved in the direction opposite to the arrow A by the motor reverse rotation control by the CPU 208, and is stopped when the optical position sensor (not shown) detects that the unit 24 has reached the initial position. If the next document read start command is not input from the external equipment 300 while the optical system is returned, the unit 24 is fixed in the initial position, thus ending the image reading/transfer operation. In this embodiment, a direction in which the document is mechanically scanned is called a sub-scan direction, and a direction perpendicular to the sub-scan direction, i.e., a direction in which the CCD 22 as the line sensor electrically scans, is called a main scan direction.

In FIGS. 4(a) and 4(b), the CCD 22 on the CCD driver 23 is driven through a CCD driving circuit 203 in accordance with timing signals such as pixel clocks $\phi 1$ and $\phi 2$, a reset signal $\phi R$ for the CCD 22 for each pixel, and a sync signal $\phi SH$ for each line which are generated by the timing generating circuit 209. Note that the signals φ1, φ2, and φR are not shown, and the signal φSH corresponds to a signal HSYNC shown in FIG. 5. An analog image signal output from the CCD 22 is amplified by an AMP (amplifier) 201, and is input to an A/D (analog-to-digital) converter 202. The A/D converter 202 converts the analog image signal into a 6-bit digital signal in synchronism with a timing signal φAD generated by the timing generating circuit 209, and outputs the digital signal to the control unit 21.

The control unit 21 selects one of the above-mentioned two modes, e.g., the bi-level and multi-level modes, and outputs the 6-bit digital signal to the external equipment 300 in the selected mode. These two modes are selected in accordance with the command from the external equipment 300, and the CPU 208 outputs a control signal corresponding to the command to the selector 206.

In the multi-level mode, the 6-bit image signal is converted to a 4-bit signal, and is input to the selector 206. The selector 206 selects the 4-bit signal, and sends the selected signal to the interface circuit 207. The interface circuit 207 causes a packing circuit 214 to pack 4-bit signals for two pixels to obtain an 8-bit signal in the multi-level mode, and outputs the 8-bit signal to the external equipment 300.

In the bi-level mode, the 6-bit image signal is converted to a 1-bit signal by a binarizing circuit 205 in accordance with a slice level (threshold value) output from the CPU 208, and the 1-bit signal is sent to the selector 206. Two slice levels are used in this case. One level is designated by the external equipment 300. In this case, the CPU 208 directly outputs the slice level designated by the external equipment 300 to the binarizing circuit 205. The other level is determined in accordance with a background density detection of a background density detecting circuit 204. More specifically, the background density detecting circuit 204 detects a maximum density (brightest value) for each line in the image main scan direction, and the CPU 208 fetches the maximum densities for several lines. The CPU 208 averages the maximum densities for several lines and outputs the average density to the binarizing circuit 205 as the slice level. With this processing, the binarized image signal is input to the selector 206.

The selector 206 selects the bi-level or multi-level signal in accordance with the control signal from the CPU 208, and outputs the selected signal to the packing circuit 214. The packing circuit 214 packs signals for 8 pixels in the bi-level mode, or pack signals for 2 pixels in the multi-level mode, and outputs the packed signal to a buffer RAM (Random Access Memory) 215.

When the image signal is written in the buffer RAM 215, a variable magnification operation is performed in accordance with the pixel density and the magnification factor sent in advance from the external equipment 300 such as a host computer. That is, the CPU 208 sets a designated clock thinning factor in a clock thinning circuit 212, so that thinned clocks having appropriate pulse intervals are output from the clock thinning circuit 212, and are supplied to an address generating circuit 213. The clock thinning circuit 212 forms thinned clocks by thinning write clocks generated by the timing generating circuit 209. The address generating circuit 213 starts counting of the thinned input clocks from a preset start address, thereby generating write addresses of the RAM 215. Thus, the image signals can be subjected to pixel density conversion and variable magnification processing in the main scan direction, and can be written in the buffer RAM 215.

The buffer RAM 215 is divided into two banks (buffer areas) which can be switched by the CPU 208. Each time an image signal for one line is written, the CPU 208 switches the banks. In an image data transfer mode, the CPU 208 sets a bank which completed write access in the address generating circuit 213. Then, the CPU 208 causes the address generating circuit 213 to count addresses in response to clocks having a predetermined frequency corresponding to a transfer rate, generated by the timing generating circuit 209, thereby reading out image data written in the buffer RAM 215. The CPU 208 then transfers the read-out data to the external equipment 300 through the interface circuit 207. During the transfer operation, image data transfer can be interrupted in units of bytes in response to a BUSY signal supplied from the external equipment 300 to the interface circuit 207. A 1-line transfer end signal is supplied to the CPU 208 as an interrupt signal.

An actual transfer operation of image data in the circuit shown in FIGS. 4(a) and 4(b) will be described in more detail with reference to the timing chart shown in FIG. 5.

Figure 5:
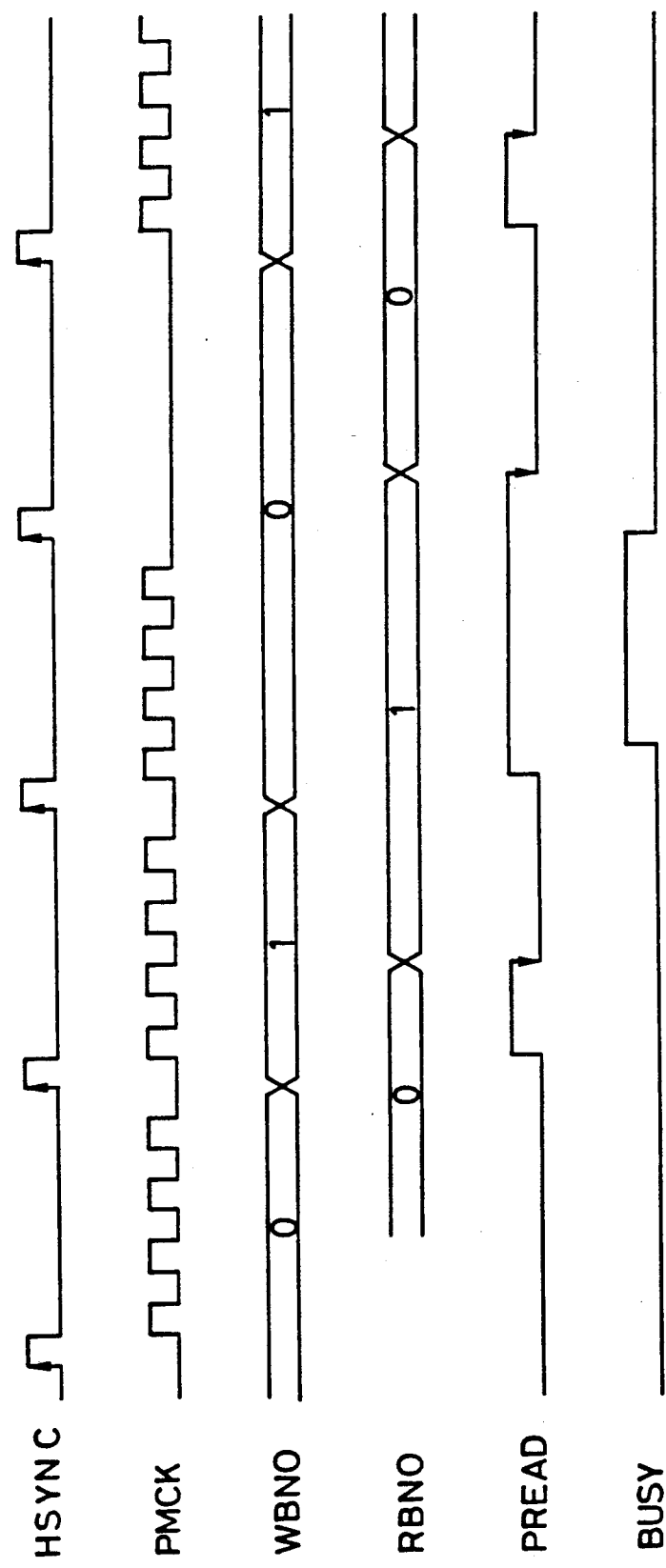
FIG. 5 is a timing chart showing the operation of the circuit shown in FIG. 4.

In FIG. 5, HSYNC, represents a horizontal sync signal having a predetermined period which is generated inside the reader 1 in this embodiment. PMCK is a pulse signal to be supplied to the pulse motor driving circuit 211. WBNO represents a number of the write bank in the buffer RAM 215, and RBNO represents a number of the read bank. A signal PREAD indicates that image data is being transferred. The signal PREAD is set by the CPU when the data transfer is started, and is reset when the transfer is completed. In addition, BUSY is a busy signal supplied from the external equipment (host computer) 300 to the interface circuit 207. The reader 1 controls the transfer operation of image signals and operates synchronously with the external equipment based on the busy signal BUSY. The banks of the RAM 215 are alternately subjected to write and read access operations of image signals for one line. The pulse signal PMCK, the sync signal HSYNC, the transfer signal PREAD, the write bank number WBNO, and the read bank number RBNO are output from the CPU 208. Interrupt signals are supplied to the CPU 208 at the leading edge of the sync signal HSYNC and the trailing edge of the transfer signal PREAD.

The CPU 208 checks the state of the transfer signal PREAD in synchronism with interruption of the sync signal HSYNC. If data is not being transferred, the CPU 208 updates the write bank number WBNO to switch a bank area subjected to write access, and sets the transfer signal PREAD at positive (true) level, thus starting transfer of image signals from a bank area designated by the read bank number RBNO. Then, the CPU 208 supplies the pulse signal PMCK to the pulse motor driving circuit 211. Upon interruption of the sync signal HSYNC, if image signals are being transferred, the CPU 208 performs no processing, and ends interrupt processing. Upon interruption of the transfer signal PREAD, the CPU 208 determines that read access of image signals from the designated bank is completed, and forcibly updates the read bank number RBNO, thus completing interrupt processing.

A method of generating the pulse signal PMCK will be explained below. A value for performing a toggle operation in which four pulses are generated in a 1-line read period is preset in an internal timer of the CPU 208, and enable data is written in a control register of the timer, so that the internal timer of the CPU 208 automatically generates the four pulses PMCK.

Note that when the BUSY signal is input from the external equipment, the transfer operation of image signals is temporarily interrupted.

As described above, the transfer operation of image data can be performed while being synchronized with the host computer of the external equipment 300 in units of lines.

A sub-scan variable magnification operation will be explained below. Assume that an equal magnification, i.e., 100% is set when the signal PMCK consisting of four pulses per line is supplied to the pulse motor driving circuit 211, as described above. In this case, as is known, if the signal PMCK consists of eight pulses per line, a 50% variable magnification can be set. If the signal PMCK consists of two pulses per line, a 200% variable magnification can be realized. A method of determining the number of pulses per line corresponding to variable magnification factors between 50% and 200% will be described below in detail.

A sub-scan magnification factor is represented by:

$$A/B \text{ (where A and B are positive integers)} \quad (1)$$

The number of drive pulses required for the sub-scan driving pulse motor 400 for a -1-line read operation in the equal-magnification is given by:

$$P \text{ (where P is a positive integer)} \quad (2)$$

The number of actual feed pulses is given by:

$$Q \text{ (where Q is a positive integer)} \quad (3)$$

An algorithm for outputting Q or Q+1 pulses and for performing a variable magnification in the sub-scan direction by an integer arithmetic operation performed by the CPU 208 will be described below.

An error d in 1-line sub-scan driving is represented by the following equation:

$$d = P \cdot B/A - Q (\text{where } 0 \leq d < 1) \quad (4)$$

Therefore, the accumulated error for the mth line is:

$$m \cdot d = m(P \cdot B/A - Q) \quad (5)$$

In order to reduce the accumulated error, variables fm and gm are introduced:

$$m \cdot d = fm + gm \quad (6)$$

(where fm is a positive integer; $0 \leq gm < 1$; f0 = g0 = 0)
In equation (6), fm+1 and gm+1 for the (m+1)th line are determined as follows:

$$\text{if } 0 \leq gm+d < 1, fm+1 = fm, gm+1 = gm+d \quad (7)$$

$$\text{if } gm+d \geq 1, fm+1 = fm+1, gm+1, = gm+d-1 \quad (8)$$

The number of actual feed pulses of the sub-scan driving pulse motor is given by Q, while when the variable f is incremented by one, and the number of actual feed pulses is given by Q+1. Thus, the accumulated error due to the sub-scan variable magnification can be converged to within one pulse. In order to execute the above variable magnification algorithm by the integer arithmetic operation, if A is multiplied with both sides of the following relation (9):

$$gm + d \geq 1 \quad (9)$$

then $$A(gm + d) \geq A \quad (10)$$

$$A(gm + P \cdot B/A - Q) \geq A \quad (11)$$

$$A \cdot gm + P \cdot B - Q \cdot A \geq A \quad (12)$$

Therefore, if a variable represented by the following equation is introduced:

$$Gm = A \cdot gm \quad (13)$$

the following variable magnification processing is allowed. The data represented by the following equations are calculated for required lines:

$$Q = iNT(P \cdot B/A) \text{ (iNT is an integer)}$$

$$D = P \cdot B - Q \cdot A$$

and, the following decision is performed for Gm=0:

$$Gm + D \geq A$$

If the decision result is TRUE, Gm+1=Gm+D−1 is established, and the number of pulses supplied to the pulse motor driving circuit 211 is set to Q+1. If the decision result is FALSE, Gm+1=Gm+D is established, and Q pulses are supplied to the pulse motor driving circuit 211.

When the number P of pulses is determined in units of lines, accurate sub-scan variable magnification can be realized, such that sub-scan positional precision falls within one step of the pulse motor 400.

However, in this case, as the reduction factor becomes larger, the number of pulses per line is increased, as can be seen from equation (2), and the drive frequency is increased. If the drive frequency is increased and exceeds the self-excitation frequency of the pulse motor 400, the pulse motor 400 cannot be driven. Therefore, the reduction factor is limited to a specific range. In this embodiment, the above-mentioned pulse member determination method is not used in the reduction mode, and the number P of drive pulses per line is set to be that corresponding to 100% (i.e. four pulses). When image data is transferred to the external equipment 300, image data is transferred while being thinned in units of lines. Thus, reduction with almost no limitation in reduction factor is realized. The reduction method will be described in detail.

The CPU 208 includes a base-100 counter which sequentially counts up to 99 during image read scanning in response to interruption of the sync signal HSYNC. The CPU 208 compares an active transfer line number corresponding to a magnification factor preset by the external equipment 300 with the read bank number RBNO of the base-100 counter. If the transfer is active, the CPU 208 starts transfer of image data. If the transfer is inactive, the CPU 208 does not start transfer of image data, and updates only the read bank number RBNO, thus thinning image data in units of lines during data transfer. In this manner, reduction in the sub-scan direction in units of 1% can be performed.

A method of setting the active transfer line number in the reduction magnification factor is the same as a variable magnification method by clock thinning using a decimal counter in a reduction mode. When a line to be thinned is set using the decimal counter, a table like Table 1 below is set in an internal memory of the CPU 208. Note that the mark "o" in Table 1 indicates an active line.

TABLE 1

| Number of Active Lines | Value of Counter | | | | | | | | | |
|---|---|---|---|---|---|---|---|---|---|---|
| | 1 | 2 | 3 | 4 | 5 | 6 | 7 | 8 | 9 | 10 |
| 5 | o | | o | | o | | o | | o | |
| 2 | | o | | | | o | | | | |
| 1 | | | o | | | | | | | |
| 1 | | | | | | | | | o | |

In the case of Table 1, thinning is performed using combinations of the number of active lines (5, 2, 1, 1) from the number of lines = 10. For example, if the number of active lines if 5, values of a line counter = 1, 3, 5, 7, and 9 correspond to the active lines, and a variable magnification of 50% (5/10) is set. Similarly, when the number of active lines is 2, the values of the line counter = 2 and 6 correspond to the active lines, and a variable magnification of 20% (2/10) is set. For example, a variable magnification of 7/10 can be achieved by a combination of the numbers of active line = 5 and 2.

When data to be thinned is set in practice, for example, active lines can be determined using a combination of Table 1 in correspondence with a desired variable magnification factor in a 10's digit and 1's digit of the base-100 counter. For example, in the 10's digit, count values according to the numbers of active lines = 5 and 2 (i.e., line count values = 1, 2, 3, 5, 6, 7, 9) correspond to active lines. In the 1's digit, count values according to the number of active lines = 5 (i.e., line count values = 1, 3, 5, 7, 9) correspond to active lines. In this case:

$$\frac{(2 + 5) \times 10 + 5}{100} = \frac{75}{100}$$

That is, a variable magnification of 75% in the subscan direction can be realized.

Figure 6A:
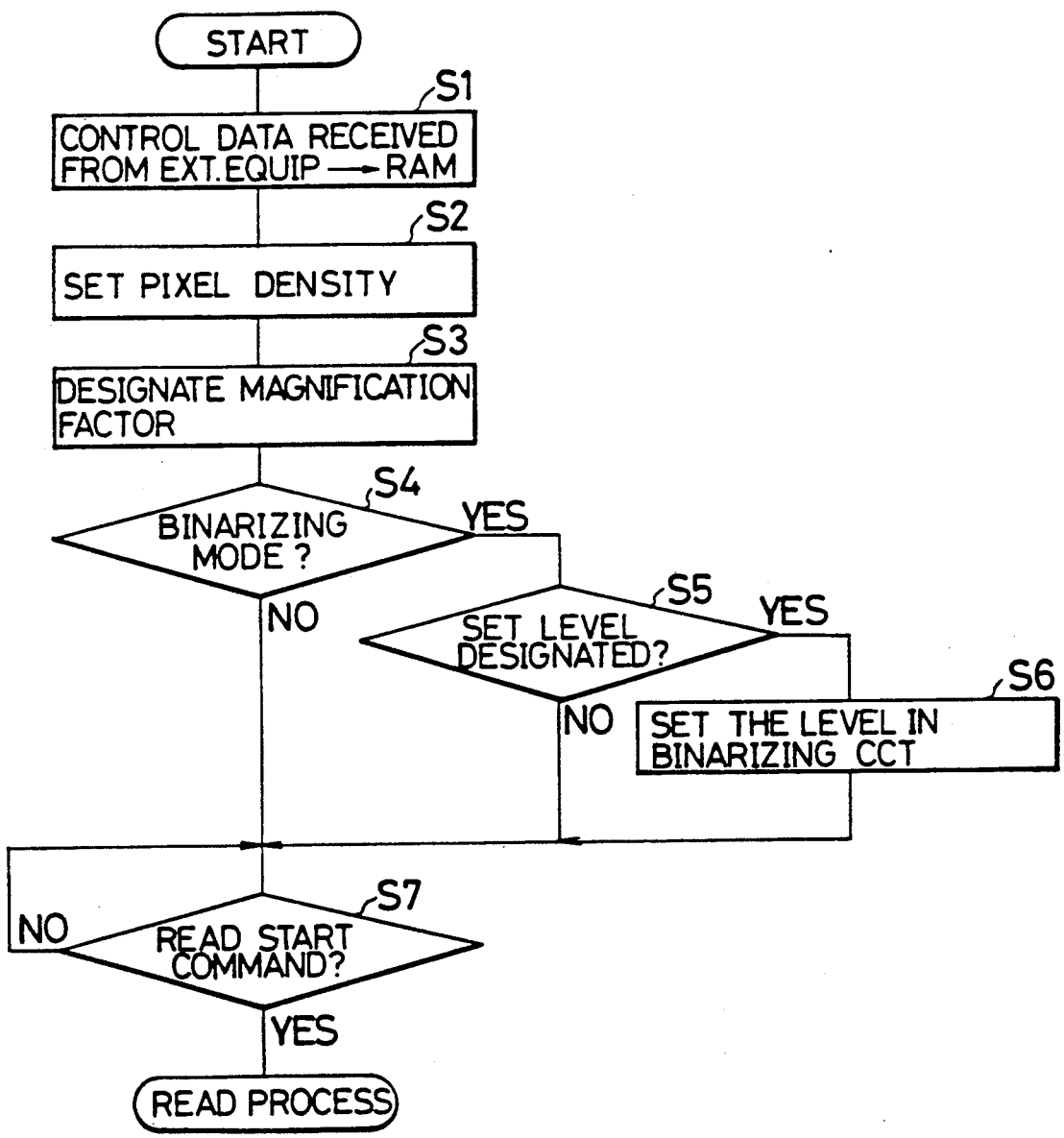

FIGS. 6(A), 6(B) and 6(C) are control flow charts executed by the CPU 208. The processing procedures of the CPU 208 will be described hereinafter in detail.

FIGS. 6(A) and 6(B) show an example of image read processing according to this embodiment. When the CPU 208 receives control data for designating, e.g., the pixel density, the bi-level or multi-level mode, and the like from the external equipment 300, it develops these control data in a work area of the RAM thereof in step S1.

In step S2, the CPU 208 sets various timing signals generated by the timing signal generating circuit 209 in accordance with the designed pixel density (e.g., 400 dpi, 300 dpi, 200 dpi, or 100 dpi). In step S3, the CPU 208 sets a thinning factor corresponding to a designated magnification factor (50% to 200%) in the clock thinning circuit 212.

It is checked in step S4 if the designated content of the read mode from the external equipment 300 is the multi-level or bi-level mode. If the bi-level mode is designed, the selector 206 is set correspondingly, and the flow advances to step S5 to check if a setting content in the bi-level mode, e.g. the slice level, is designated. If YES in step S5, the flow advances to step S6, and the designed slice level is set in the binarizing circuit 205. After this procedure, or if NO is determined in step S5, the flow advances to step S7. If it is determined in step S4 that the multi-level mode is designated, the selector 206 is set correspondingly, and thereafter, the flow advances to step S7.

It is checked in step S7 if the read start command is supplied from the external equipment 300. If YES in step S7, the read processing shown in FIG. 6(B) is performed.

In the read processing, a document is placed on the platen glass 27 so that the right end in FIG. 2 corresponds to the leading end of the document in the book mode. The scanning start position (initial position) of the document illumination unit 24 of the optical system corresponds to the right end in FIG. 2. The position of the unit 24 is checked by the optical position sensor arranged therearound.

When the document read start command is input from the external equipment 300, the CPU 208 causes the document illumination unit 24 located at a standby position (a position illustrated in FIG. 2) in a non-read mode to move to the initial position in the read mode. Thereafter, the CPU 208 outputs a lamp control signal to turn on the lamp FL in step SB3. Thereafter, the document read scanning is not immediately started, but it is awaited for about 300 to 500 msec until the light amount of the lamp FL is stabilized in step SB4. During this interval, an image signal is input to the interface circuit 207. However, this signal is not regular image data associated with reading. Therefore, the CPU 208 outputs a control signal so as to prevent the interface circuit 207 from outputting data to the external equipment 300.

After waiting, the CPU 208 outputs a drive signal to the motor 400 in step SB5. Thus, the document illumination unit 24 starts scanning in the direction indicated by arrow A in FIG. 2. A distance between the initial position of the document illumination unit 24 and the leading end position of the document placed on the platen glass 27 is about 2 to 3 mm. During this interval, control is performed to stabilize a scan speed of the optical system by the motor.

When the document has reached the document leading end position, the CPU 208 outputs an image signal output enable signal through the interface circuit 207. Thereafter, in step SB7, the read and processed image signals are sequentially sent to the external equipment 300 in units of lines. In association with the 1-line reading, the presence/absence of inputting of the signal BUSY from the external equipment 300 is monitored. If the signal BUSY is input, supply of the image signals is immediately stopped, and driving of the motor 400 is also stopped.

During scanning, the scan length of the optical system is uniquely determined by the number of pulses for driving the motor by the CPU 208 since the stepping motor is used in this embodiment. Therefore, when the CPU 208 outputs the required number of pulses to the motor, it determines that document reading for one page is complete (step SB9). Thereafter, in step SB11, the lamp FL is turned off, and the image signal output disable signal is output. In step SB12, motor reverse rotation control is performed, and the document read end signal is output to the external equipment 300.

The optical system including the document illumination unit 24 is moved in the direction opposite to the arrow A in FIG. 2 by the motor reverse rotation control of the CPU 208, and is stopped when the optical position sensor detects that the optical system has reached the initial position. If the next document read start command is not supplied from the external equipment 300 before the optical system is returned to the initial position (step SB13), the document illumination unit 24 is moved to the initial position in step SB17, thus completing the operation.

During the document read scanning, the actual variable magnification processing in the sub-scan direction is performed by HSYNC interrupt processing generated by the main scan sync signal HSYNC. Therefore, the detailed processing content will be described with reference to FIG. 6(C).

In step S101, a transfer end flag which is set during transfer end interrupt processing is checked. If the flag is not set, the program is ended without driving the pulse motor. If the flag is set, the flow advances to step S102. If it is determined in step S102 that a selected magnification factor is larger than 100%, the flow advances to step S107; otherwise, the flow advances to step S103. In step S103, if it is determined in accordance with the reduction algorithm by line thinning that the next line is active, the flow advances to step S104. In step S104, the bank in the buffer RAM 215 is switched, and a transfer request flag is set. If the next line is inactive, the flow advances to step S105. In step S105, the number of pulses=4per line corresponding to an equal magnification is set, and the flow advances to step S106. In an enlargement mode, the number of pulses per lines for driving the pulse motor is determined in accordance with the above-mentioned algorithm in step S107. In step S108, the bank in the buffer RAM 215 is switched, and a transfer requires flag is set. Then, the flow advances to step S106. In step S106, the already determined number of pulses per line is set in an internal register of the CPU 208, and the pulse motor is started, thus ending the program. Pulse generation is performed by the CPU 208. The CPU 208 counts the number of pulses for driving the pulse motor using its internal counter. When the count value coincides with the value set in the internal register, the CPU 208 stops generation of the pulses.

In interruption generated when image data transfer is ended, the bank of the buffer RAM 215 is switched, and only when the transfer request flag is set, image data transfer is started.

The present invention is not limited to the above embodiment, and various changes and modification may be made within the spirit and scope of the appended claims.

I claim:

1. An image processing apparatus comprising:
    reading means for reading an original image line by line by scanning the original image to output an image signal for each line;
    drive means for moving a scanning position of said reading means;
    thinning means for thinning the image signal in units of lines;
    input means for inputting a variable magnification factor for enlarging or reducing the original image; and
    control means for discriminating whether the input variable magnification factor is a magnification factor for enlarging the original image or a magnification factor for reducing the original image, and for controlling said drive means and said thinning means in accordance with the discrimination result, wherein, when said control means discriminates that the input variable magnification factor is a magnification factor for enlarging the original image, said control means controls said drive means so as to vary the moving speed of the scanning position in accordance with the input variable magnification factor, and does not permit said thinning means to perform a thinning operation, and when said control means discriminates that the input variable magnification factor is a magnification factor for reducing the original image, said control means controls said thinning means so as to vary the rate of the thinning operation for the image signal in accordance with the input variable magnification factor, and causes said drive means to move the scanning position of said reading means at a constant speed.

2. An apparatus according to claim 1, wherein said drive means is provided with a pulse motor, and said control means changes a period in generation of a pulse signal applied to said pulse motor so as to vary the moving speed of the scanning position.

3. An apparatus according to claim 2, wherein said reading means has photoelectric conversion means for converting the original image into an electric signal.

4. An apparatus according to claim 3, further comprising processing means for processing the electric signal output from said photoelectric conversion means and converting the electric signal into a bi-level or multi-level digital image signal.

5. An apparatus according to claim 1, wherein said control means has a predetermined table indicating a number of lines to be thinned, and said control means causes said thinning means to thin the image signal referring to said table.

6. An apparatus according to claim 1, wherein said drive means moves said reading means with respect to a stationary location of the original image.

7. An apparatus according to claim 1, wherein said drive means moves the original image with respect to a stationary of said reading means.

8. An apparatus according to claim 1, wherein said thinning means comprises memory means for storing the image signal in units of lines and said control means controls said memory means so as to selectively read out the stored image signal.

* * * * *